Aug. 4, 1931.   W. L. WRIGHT ET AL   1,817,026
MOTION PICTURE PROJECTOR
Filed June 1, 1926    3 Sheets-Sheet 2

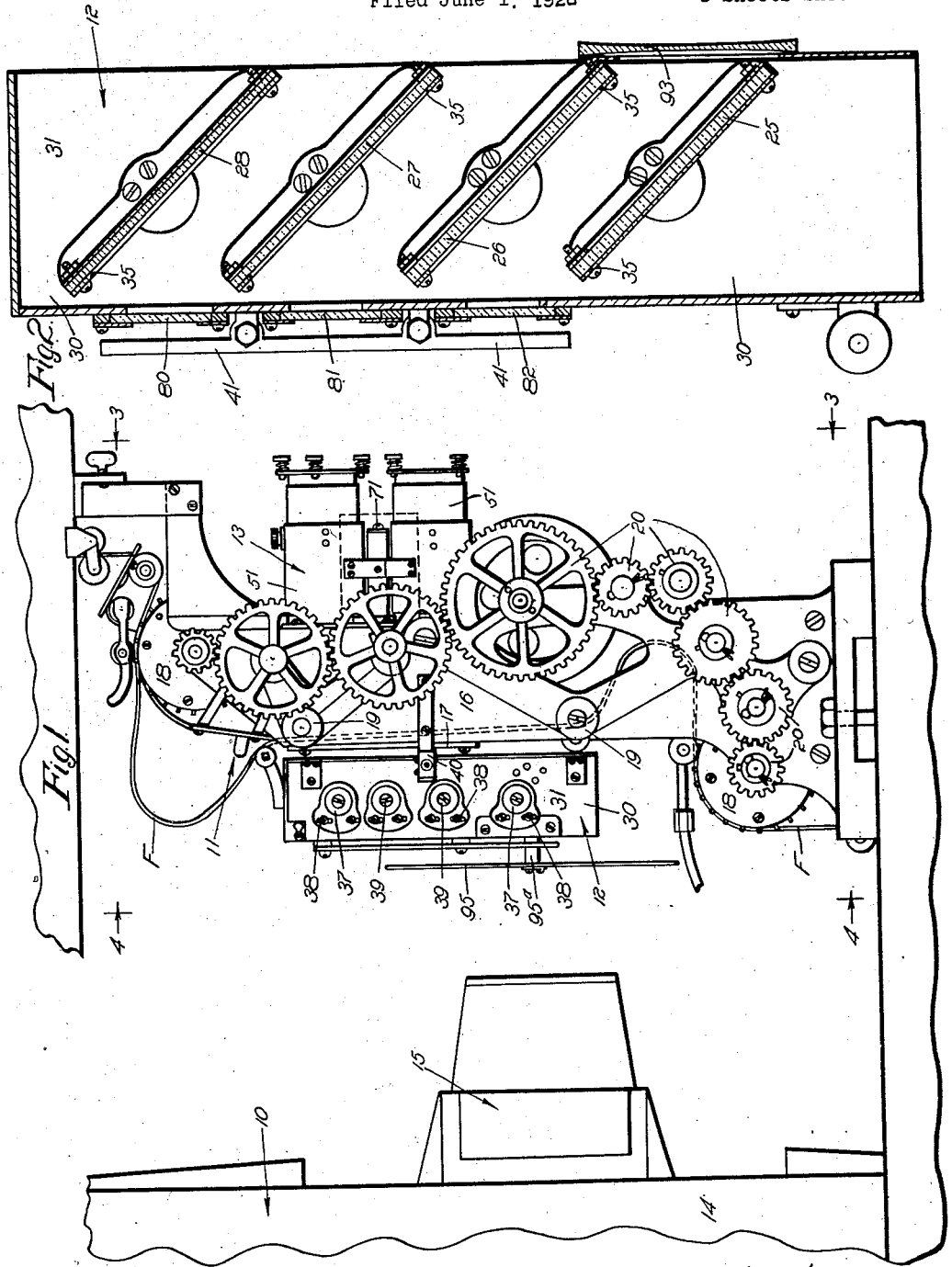

Inventors
Walter L. Wright
and Stanton M. Wright
by
Attorney

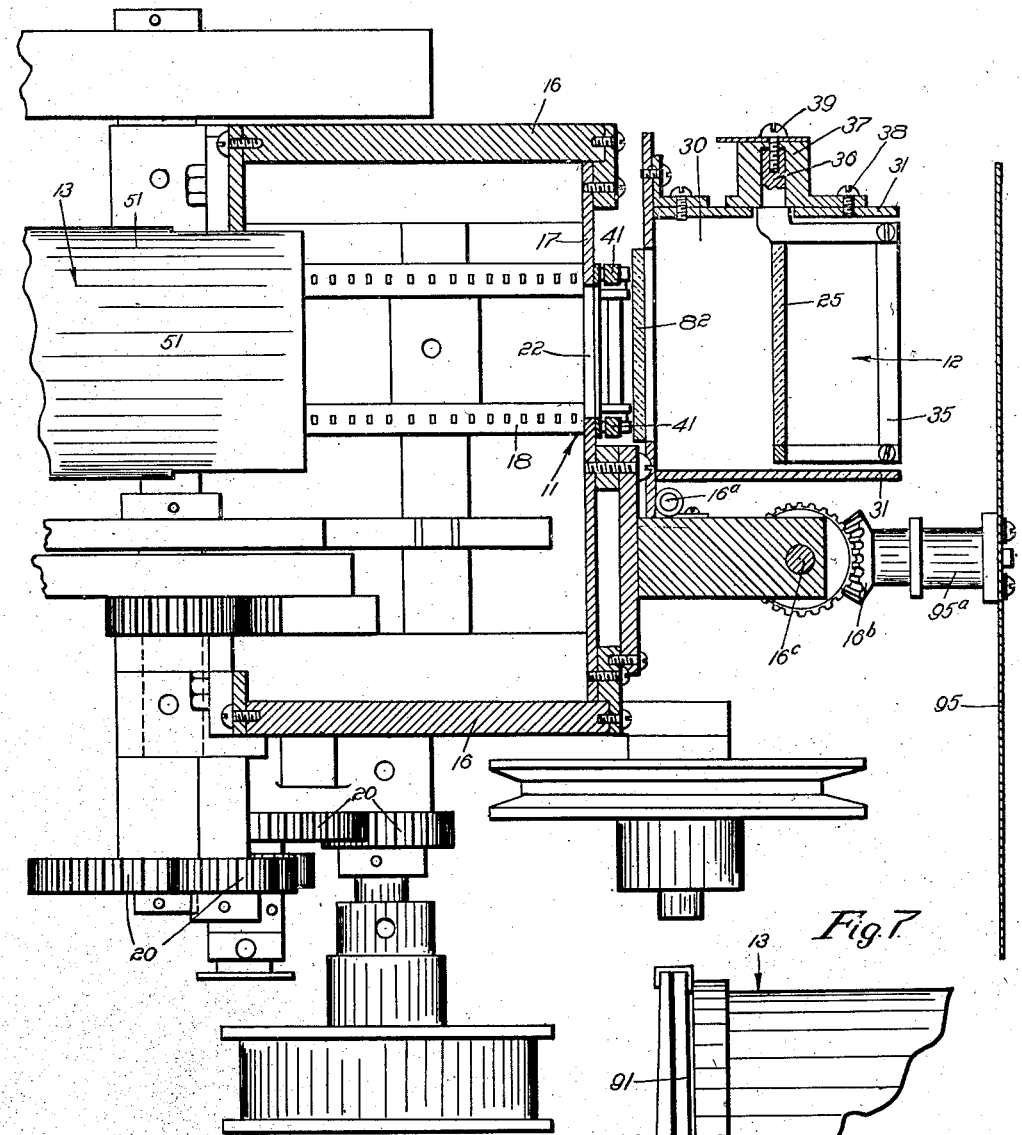

Patented Aug. 4, 1931

1,817,026

UNITED STATES PATENT OFFICE

WALTER L. WRIGHT AND STANTON M. WRIGHT, OF LOS ANGELES, CALIFORNIA

MOTION PICTURE PROJECTOR

Application filed June 1, 1926. Serial No. 112,969.

This invention has to do with a motion picture projector and has particular reference to a projector for projecting colored motion pictures.

An object of this invention is to provide a simple, effective and practical apparatus for simultaneously projecting a plurality of pictures onto a screen in register.

Another object of this invention is to provide a projector in which the parts are arranged and related so that the heat generated at the source of light does not endanger the film.

A further object of the invention is to provide a simple, effective and practical means for handling a shaft of light coming from a single source to project it through a plurality of spaced pictures to project them onto the screen in register.

A further object of this invention is to provide means for projecting three pictures adjoining each other on a single film onto a single screen in register through three lenses of standard form.

It is another object of this invention to provide a projector of the character mentioned with various improved combinations of parts and features of construction.

The objects and features of our present invention will be best understood from the following detailed description of a typical form and application of the invention, throughout which description we make reference to the accompanying drawings, in which:

Fig. 1 is a side elevation of the projector.

Fig. 2 is a vertical detailed sectional view of a portion of the projector, being a view taken substantially as indicated by line 2—2 on Fig. 4.

Fig. 6 is an enlarged plan section taken as indicated by line 6—6 on Fig. 4 and

Fig. 7 is an enlarged detailed sectional view of a modified form of construction.

Figure 3:
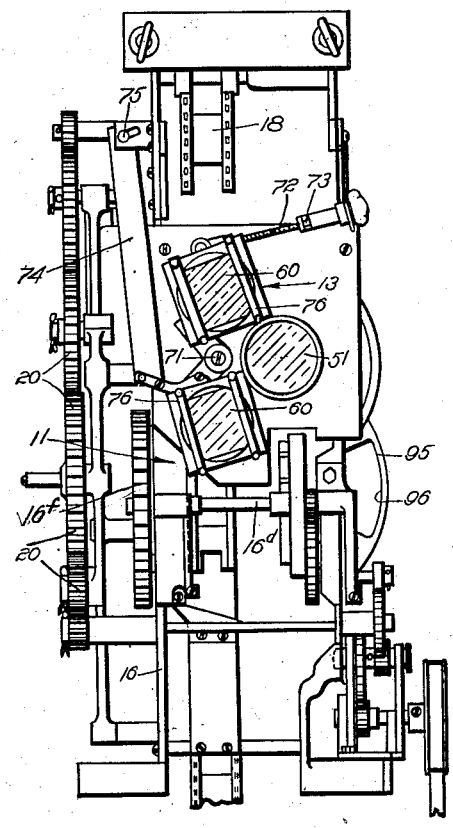
Fig. 3 is a front elevation of the projector, being a view taken as indicated by line 3—3 on Fig. 1.
Figure 4:
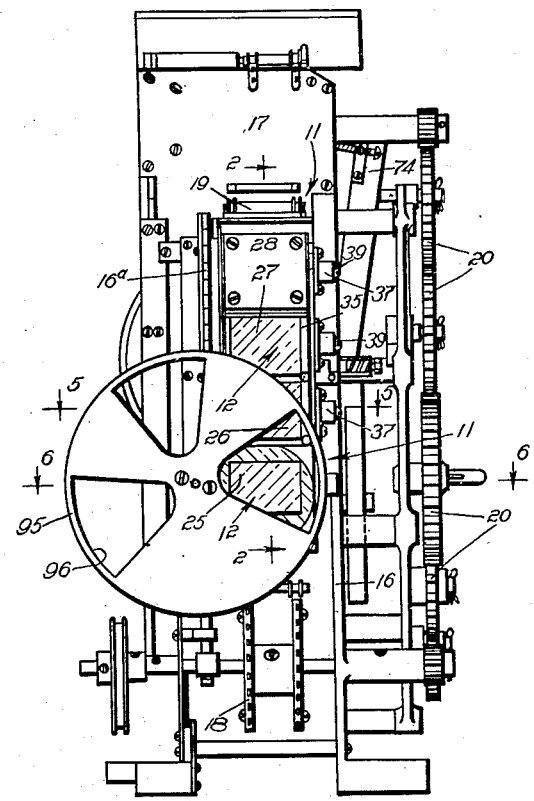
Fig. 4 is a view of the projector taken as indicated by line 4—4 on Fig. 1.

The present invention relates, generally, to motion picture projectors, and provides various features of arrangements and construction applicable generally to motion picture projectors. More specifically, our invention relates to a projector for handling a single film on which are series of pictures of different colored portions or values of a subject, the several pictures of each series being arranged to adjoin each other. We will proceed in setting forth our invention, to describe in particular the invention as applied to and embodied in a form suitable for handling film of the particular character just mentioned, it being understood that we do not wish the broader features of the invention to be construed as limited to, or by, the details we may mention.

The apparatus embodying our invention includes, generally, a source of light, 10, film handling means 11, light distributing means 12 for receiving light from the source 10 and directing it through a plurality of pictures on the film F, handled by the means 11, and an optical system 13 for handling the light after it has been projected through the film.

The source of light 10, may, as far as our invention is concerned, generally, be any ordinary or standard source of light, such as is suitable for apparatus of this general character. For purpose of example we will consider the source of light 10 in the form of an ordinary electric arc, mounted in a suitable lamp house 14, provided at its front with a condenser lens 15 for projecting a slightly convergent shaft of light from the arc.

The film handling means 11 may be similar, generally, to that employed in projecting apparatus, in that it may include a frame 16, a vertically disclosed aperture plate 17 carried by the frame, film carrying sprockets 18, mounted at either end of the aperture plate, suitably arranged film guiding rollers 19, drive means for the film sprockets and various parts and devices familiar to those skilled in the art. The drive means may include a train of gears 20 and an intermittent movement device (not shown) with film engaging means operable to intermittently advance the film past the aperture plate in proper synchronism with the said sprockets 18. In this particular disclosure we are considering the film F as carrying a plurality of series of pictures, the pictures of each series being of different colored portions or values of a subject and being arranged in a group so that they adjoin one another as do adjoining pictures on an ordinary standard motion picture film. This being the case, the operating mechanism of the film handling means is made such as to advance the film a distance corresponding to three pictures, or one of said series, each time it is moved. In this particular, our mechanism will, in practice, differ from the standard film handling mechanism, the difference being in the distance or amount that the film is advanced at each movement. In handling the particular film which we have referred to, the aperture plate 17 is provided with three apertures 22, the apertures bearing the same relation to each other as do the pictures in each series on the film F.

The light distributing means 12, provided by our invention, is arranged between the source of light 10 and the film handling means 11, and operates to receive the single shaft of light from the source of light and divide it into three separate shafts which it directs through the apertures 22 and the film arranged at the apertures. The light distributing means 12 includes, generally, a first reflector 25, arranged at an angle of 45 degrees in the path of the shaft of light coming horizontally from the source of light 10, a first light-dividing element, or light divider 26 located above the reflector 25 to receive the light reflected upwardly by the reflector 25 and operable to pass a part of the light so that it continues upwardly, and reflect off the rest of the light horizontally, a second light divider 27, arranged above the first light divider 26 adapted to receive the light passed by the first divider and operable to pass part of this light so that it continues upwardly, and to reflect off the balance horizontally, and a top or second reflector 28, arranged above the second divider to reflect the light passed by the second divider horizontally. The first reflector 25, the two light dividers 26 and 27 and the second reflector 28 are arranged in vertical alignment, and are spaced and arranged in parallel planes so that the shafts of light which are reflected off by the dividers and the second reflector are parallel and spaced apart in vertical alignment in the same spaced relation as the pictures in each series on the film F, causing these shafts of light to pass through the apertures and the film at the apertures. The reflectors and dividers of the light distributing means may be mounted in a suitable carrier 30, which carrier may be suitably mounted on the frame 16 of the film handling means. In the form of construction shown in the drawings, the carrier is formed with spaced side walls 31 between which are mounted the reflectors and dividers. In the construction shown in the drawings the reflectors and dividers are mounted in individual frames 35, each frame being provided with a trunnion 36, rotatably carried in a bearing 37, adjustably mounted on one of the side walls 31 of the carrier. The bearings 37 are set in the desired adjusted position on the side wall by suitable screws 38, while the trunnions 36 are set in the desired rotative position in the bearings 37 by clamp screws 39. By this construction the reflectors and dividers are shiftable bodily through movement of the bearings, and are rotatable through movement of the trunnion in the bearings, so that they can be accurately adjusted and set in proper operating position.

The light reflectors 25 and 28 hereinabove referred to may be of any construction or formation suitable for performing the functions mentioned. Likewise, the light dividers 26 and 27, may be of any construction or formation which will accomplish the function stated. In practice, we can employ silvered glass plates for the light divider 26, and a partially, or thinly silvered glass plate for the divider 27. To withstand heat the reflectors may be fused silica and the dividers may be mica.

The carrier hereinabove described may be mounted on the frame 16 of the film handling means in various manners. In the construction shown in the drawings, the carrier is pivotally mounted at one side of the frame 16 by a shaft 16a and is normally held in operating position by a releasable catch device 40. With this construction, the carrier can be conveniently swung out of position at the film handling means when it is desired to handle the film or make repairs to the film handling means. Further, with this construction a tension plate or shoe 41 may be mounted on the carrier to engage the film and hold it in proper operating position at the aperture plate when the carrier is closed.

Figure 5:
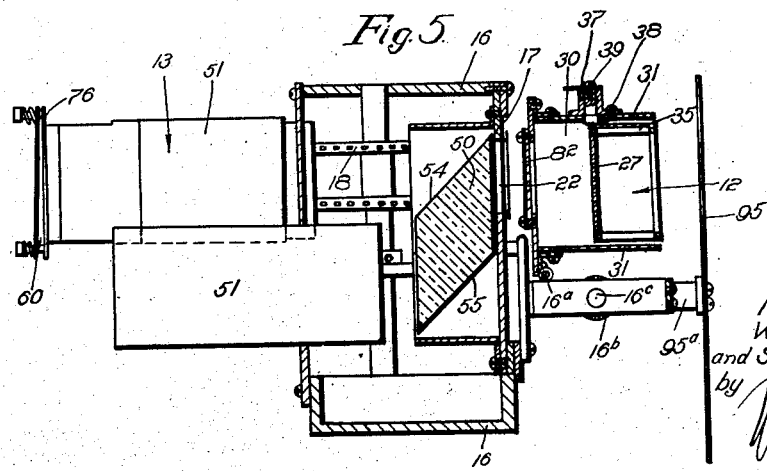
Fig. 5 is a plan section, taken as indicated by line 5—5 on Fig. 4.

The optical system 13 provided by our invention, is arranged to receive the light projected through the several pictures on the film F and to direct it onto a screen so that the several projected pictures are in perfect register at the screen. In the particular form of construction shown in the drawings the optical system is embodied in, or carried by frame 16 of the film handling means, and includes, generally, a prism 50, arranged to offset in a horizontal direction the middle shaft of light, that is, the shaft reflected off by the second light divider 27. The optical system, in addition to this offsetting prism 50, includes individual lens devices 51, which may be the same as are ordinarily employed in projectors, one for projecting each shaft of light onto the screen. The offsetting prism 50, as shown in Fig. 5 of the drawings is formed with a vertically disposed silvered face 54, arranged at an angle of 45 degrees in the path of the shaft of light, passing through the middle aperture 22, and with a second vertically disposed silvered face 55, parallel to the face 54, and offset horizontally from the face 54 the distance it is desired to offset the shaft of light. The prism is arranged with relation to the aperture 22 so that the light passing through the aperture enters one side of the prism, falls upon the face 54, is reflected thereby horizontally at right angles to the direction it enters the prism onto the face 55, which reflects it off through the other side of the prism in the same direction that it entered the prism. By thus offsetting the shaft of light passing through the center aperture and the center picture of the series of pictures on the film, the several shafts are spaced so that there is sufficient room to pass each shaft through an individual lens device 51 of standard form. If the shafts are not spaced in this manner, serious difficulties arise in the arrangement of the lens device. In the preferred arrangement, the offset lens device, that is, the one which possesses the shaft of light offset by the prism, is mounted stationary, while the other two lens devices are mounted so that they are adjustable. Corrective prisms 60 are mounted on or with the adjustable lens devices to bring the shaft of light passing through them into register at the screen with the shaft of light passing through the stationary lens device. The movable or adjustable lens devices 51 are pivotally mounted on a single pivot pin 71, located so that its axis coincides with the central axis of the shaft of light passing through the center aperture. Suitable means are provided for setting the movable lens devices in the desired rotative positions. In the construction shown in the drawings one of the lens devices is adjustably held by a screw 72 adapted to be set by a lock nut 73, while the other lens device is adjustably held by an arm 74 that can be set by a screw 75. Each of the corrective prisms 60 is carried by a suitable frame 76 rotatively mounted on the outer end of one of the movable lens devices. By this construction the movable lens devices 51 can be adjusted about the pivot pin 71 and the corrective prisms 60 can be adjusted on the lens devices so that the pictures thrown on the screen through the movable lens device can be moved vertically and horizontally into perfect register with the picture thrown on the screen through the stationary lens device.

In accordance with our invention we provide means whereby the light projected through the several different pictures onto the screen is colored, corresponding to the colors to which the pictures correspond. For instance, in the case of the film hereinabove described, the three pictures of each series are of three different color portions or values of a common subject. We will consider one of the pictures, for instance, the uppermost of the series as being of the violet portion of the subject, the lowermost picture of the series as being of the green portion of the subject and the middle picture of the series as being of the orange portion of the subject. With this particular film we provide means in the projector whereby the light projected from the uppermost movable lens device is violet, while that projected from the lowermost lens device is green and that projected through the stationary or middle lens device is orange.

In accordance with the broader aspects of our invention the light filtering means whereby the said color values are obtained, may be embodied in, or applied to, the apparatus in various manners. In Figs. 2, 5 and 6 of the drawings we show color filters 80, 81 and 82 arranged between the second reflector 28 and the two light dividers and the aperture plate so that the filter 80, which is a violet filter, filters the light passing from the second reflector 28 through the aperture, while the filter 81, which is an orange filter, filters the light passing from the reflector 28 through the center aperture, while the filter 82, which is a green filter, filters the light passing from the divider 26 through the lowermost aperture. Another arrangement that may be employed in place of that just described, is the application of silver to the light divider 27 in a very thin body so that the light passing through the divider is violet, in which case the violet filter 80 is not necessary. Further, the filters to which we have referred may be arranged at various points in the apparatus. For instance, they may be arranged at, or embodied in the optical system; for instance, the proper color filters may be applied to the lens devices 51. In Fig. 7 of the drawings we illustrate a color filter 90, applied to one of the lens devices and have shown the color filter 90 in combination wth a corrective prism 60. In the particular construction illustrated the filter 90 is in the form of a filament confined between one side of the prism 60 and an optically flat transparent plate 91. It will be apparent that the proper filters, arranged at the lens devices will accomplish the action desired, as well as will the arrangement first described.

In addition to the elements herein so far mentioned it is desirable to provide a plano concave lens 93 between the condensor lens 15 and light distributing means 12, to spread the rays of the shaft of light coming from the condenser lens slightly, so that they are as nearly as possible parallel. Further, the usual shutter 95 which operates to cut off the light from the screen during the periods of film movement, is embodied in the projector, it being preferred to arrange the shutter between the condenser lens 15 and the light distributing means 12. The shutter 95 may be the ordinary disc type of shutter, having the usual aperture 96 for passing light, and may be driven or operated in proper synchronism with the film handling means through any suitable drive. We have shown an arrangement in which the shutter shaft 95a is driven from the shaft 16c through bevel gears 16b. The shaft 16c is driven from a suitable drive shaft 16d through gears 16f. With this arrangement the shutter moves with the carrier and always stays in proper timed relation.

Having described only a typical preferred form of our invention we do not wish to limit ourselves to the specific details set forth, but wish to reserve to ourselves any changes or variations that may appear to those skilled in the art or fall within the scope of the following claims:

Having described our invention, we claim:

1. In a projector for handling a film carrying a series of pictures each series including three pictures, means for directing shafts of light passed through the pictures onto a screen in register embodying, two lens devices directly in the path of two of the shafts of light, a third lens device offset from the path of the third shaft of light, and means for offsetting said third shaft of light to pass through said third lens device.

2. In a projector for handling a film carrying series of pictures each series including three pictures, means for directing shafts of light being passed through one of the series of pictures onto a screen in register embodying lens devices in the path of the shafts of light passing through the end pictures of the series and a third lens device offset from the shaft of light passing through the middle picture, and means for offsetting the shaft of light passed through the middle picture so that it passes through the third lens device.

3. In a projector for handling a film carrying a series of pictures each series including three pictures, means for directing shafts of light being passed through one of the series of pictures onto a screen in register embodying lens devices in the path of the shafts of light passing through the end pictures of the series and a third lens device offset from the shaft of light passing through the middle picture, and a prism for offsetting the shaft of light passed through the middle picture so that it passes through the third lens device.

4. In a projector for handling a film carrying a series of pictures each series including three pictures, means for directing shafts of light passed through the pictures onto a screen in register embodying, two lens devices directly in the path of two of the shafts of light, a third lens device offset from the path of the third shaft of light, and means for offsetting said third shaft of light to pass through said third lens device, the lens device including means whereby the shafts of light passed through them are adjustable into register on a screen.

5. In a projector for handling a film carrying a series of pictures each series including three pictures, means for directing shafts of light passed through the pictures onto a screen in register embodying, two lens devices directly in the path of two of the shafts of light, a third lens device offset from the path of the third shaft of light, and means for offsetting said third shaft of light to pass through said third lens device, said third lens device being in set position and said two lens devices being adjustable relative to the third lens device to bring the shafts passing through the lens devices into register on a screen.

6. In a projector for handling a film carrying a series of pictures each series including three pictures, means for directing shafts of light passed through the pictures onto a screen in register embodying, two lens devices directly in the path of two of the shafts of light, a third lens device offset from the path of the third shaft of light, and means for offsetting said third shaft of light to pass through said third lens device, the lens devices being mounted so that their axes are parallel and being provided with means whereby the shafts of light passing through the lens devices are thrown into register on the screen.

7. In a projector for handling a film carrying a series of pictures each series including three pictures, means for directing shafts of light passed through the pictures onto a screen in register embodying, two lens devices directly in the path of two of the shafts of light, a third lens device offset from the path of the third shaft of light, means for offsetting said third shaft of light to pass through said third lens device, and prisms in connection with the lens device to bring the shafts of light passing through them into register on a screen.

8. In a projector for handling a film carrying a series of pictures each series including three pictures, means for directing shafts of light passed through the pictures onto a screen in register embodying, two lens devices directly in the path of the shafts of light passing through the end pictures of the series, a third lens device offset from the shaft of light passing through the middle picture of the series, means for offsetting the shaft of light passed through the middle picture of the series so that it passes through said third lens device, the lens devices being mounted so that their axes are parallel so that the third lens device is stationary and the said two lens devices shiftable, and prisms in connection with said two lens devices causing the shafts of light passing through them to fall in register with the shaft of light passing through said third lens device.

9. In a projector for handling a film carrying a plurality of series of pictures each series including three pictures, a single source of light, a film handling mechanism, means for receiving light from said source and directing it in three separate shafts through the three pictures of a series on the film, and means for projecting said shafts of light onto a screen in register including lens devices in line with the shafts of light passing through the end pictures of the series, an offset lens device offset from the shaft of light passing through the middle picture of the series and means for offsetting the shaft of light passing through the middle picture of the series so that it passes through said offset lens device.

10. In a projector for handling a film carrying a series of pictures each including three pictures arranged longitudinally on the film, a source of light means dividing the light from the source into three separate shafts of light in close proximity to each other and directing them through the pictures of a series, lens devices receiving the shafts of light after passing the film and directing the shafts of light on to a screen, one of the lens devices being offset with relation to the others, and means between the film and the offset lens device for offsetting one of the shafts of light so that it passes through the offset lens device.

In witness that we claim the foregoing we have hereunto subscribed our names this 3rd day of May, 1926.

WALTER L. WRIGHT.
STANTON M. WRIGHT.